United States Patent [19]

Schreyer

[11] 4,130,269

[45] Dec. 19, 1978

[54] TELESCOPIC TURNBUCKLE

[75] Inventor: Kenneth D. Schreyer, Clarence, N.Y.

[73] Assignee: Columbus McKinnon Corporation, Tonawanda, N.Y.

[21] Appl. No.: 875,782

[22] Filed: Feb. 7, 1978

[51] Int. Cl.² .............................................. B66F 3/10
[52] U.S. Cl. ........................................ 254/67; 903/45
[58] Field of Search ......................... 254/67; 105/973; 403/43, 47, 45

[56] References Cited

U.S. PATENT DOCUMENTS

| 310,767 | 1/1885 | Wilson | 403/45 |
| 2,485,280 | 10/1949 | Grace | 403/47 |
| 2,673,632 | 3/1954 | Stiranko | 403/45 |
| 3,028,645 | 4/1962 | Stearman et al. | 254/67 |
| 3,857,548 | 12/1974 | Takeuchi | 254/126 |

Primary Examiner—Robert C. Watson

[57] ABSTRACT

A ratchet type telescopic load binder (1) having axially and oppositely moveable first and second threaded screw members (7,8) of different diameters is disclosed. The larger diameter member (7) includes an axial cylindrical void (11) into which the smaller screw member (8) is permitted to move. Greater reach is achieved by providing the smaller member (8) with a screw thread (10) pitch and a thread (10) length which are greater than those of the larger member (7). The cylindrical void (11) of the larger member (7) extends past its operative thread (9) length to accommodate increased penetration of the smaller member (8).

11 Claims, 8 Drawing Figures

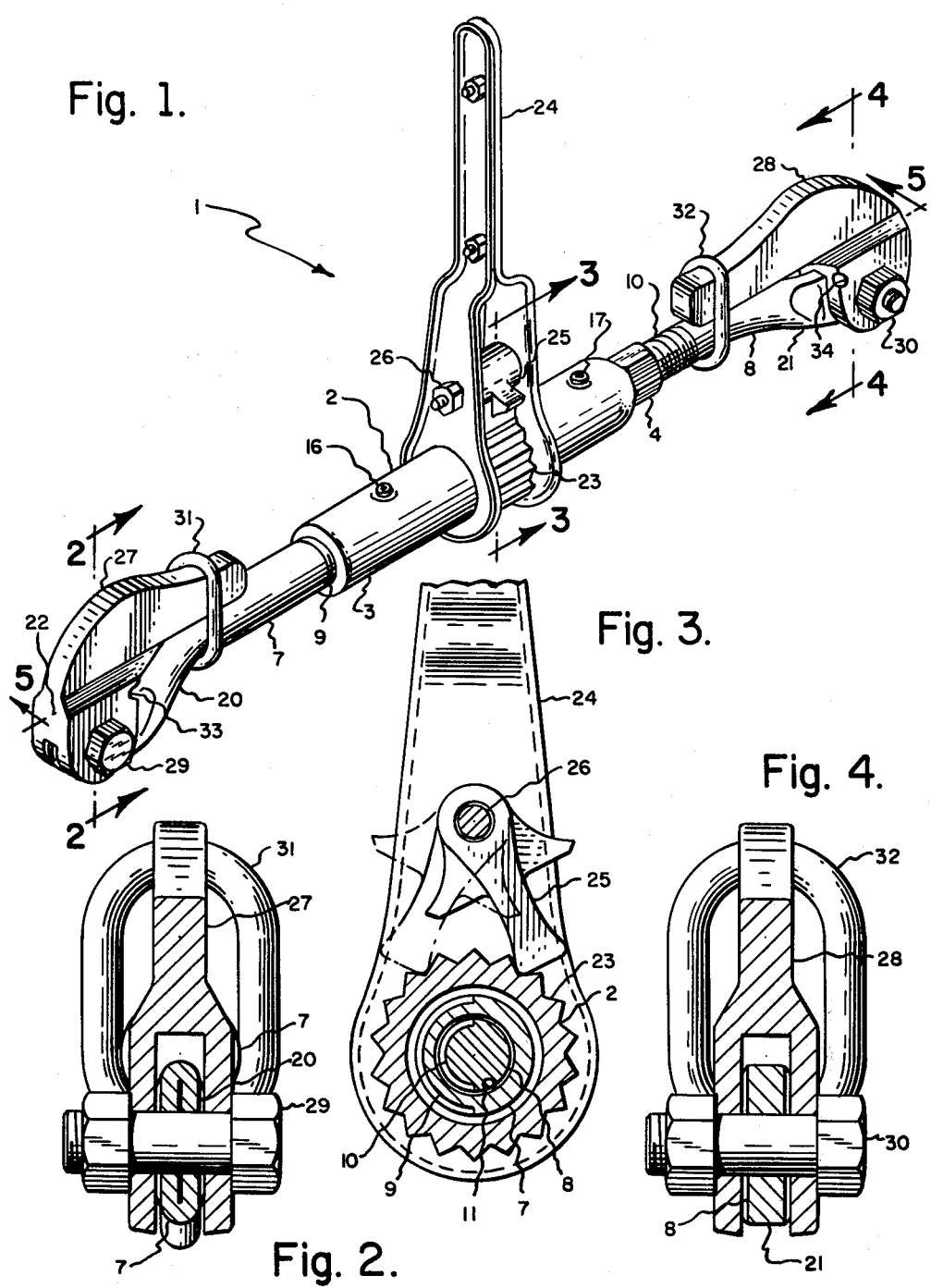

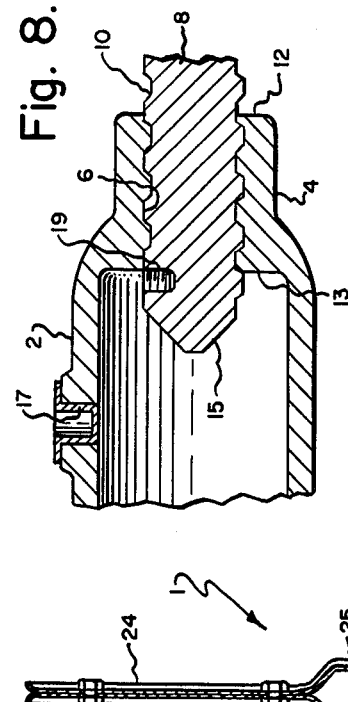
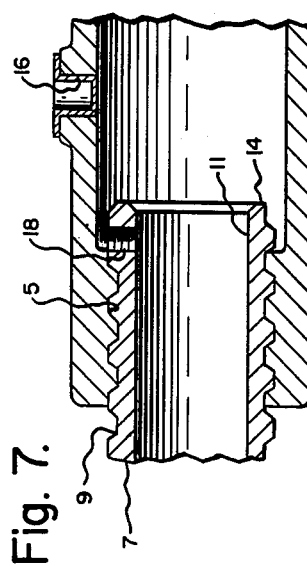
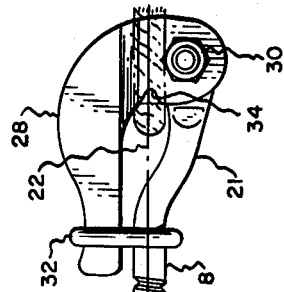
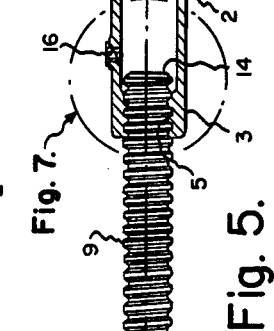
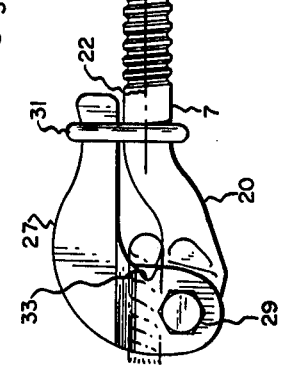

TELESCOPIC TURNBUCKLE

TECHNICAL FIELD OF THE INVENTION

The present invention relates to the technical field of tensioning devices which apply a pair of inwardly directed forces to a pair of articles. More specifically, the invention relates to large turnbuckles or load binders used for adjusting and tightening chains or cables which secure massive equipment such as are used with barges or in other heavy industrial applications.

BACKGROUND OF THE INVENTION

Heavy duty turnbuckles or screw-jack load binders for securing massive loads are well known. For example, U.S. Pat. Nos. 1,971,472 and 2,220,288 disclose steam boat ratchet load binders, which have been previously designed to withstand the tensions imposed by the towing of barges or steam boats. However, the ratchet load binders of those patents are not only heavy and therefore difficult to transport from one job to the next, but are also expensive to fabricate due to their massive proportions. Efforts have been made in the past to economize on the weight of such load binders. Accordingly, telescoping designs have been produced in which the axially oriented screw members are made to telescope within one another rather than abutting end-on in their most contracted position. This increases the degree of take-up permitted the device without requiring a commensurate increase in the total length and weight of the load binder. Such telescoping load binders are disclosed, for example, in U.S. Pat. No. 310,767 and Canadian Pat. No. 601,529. A similar telescopic construction may also be found in U.S. Pat. No. 789,071 directed to a lifting jack.

While these measures have accomplished, to a degree, the desirable result of increasing total reach without accompanying increase in total weight, or the equally desirable result of decreasing the total weight without commensurate degree in total take-up, such prior art load binding devices for heavy duty applications were still too massive to be easily handled so that further reductions in weight without a proportional reduction in reach is desirable.

THE INVENTION

The present invention permits the desired result of further reducing total weight of a heavy duty load binder without sacrificing its reach. The turnbuckle or load binder is of the type having an exterior, axially extending tubular body with first and second opposite end portions having right and left hand threads on their respective inner surfaces. First and second axially extending threaded members with exterior threads respectively engage the inner threads of one of the opposite end portions. One of the members, the first, includes an axially extending cylindrical void and is dimensioned to telescopically receive therewithin the second member in a manner similar to that found in the prior art. The threaded length of the second member, however, is provided to be at least long enough to extend from the axially outermost end of one of the end portions to a position radially adjacent to the interior threads of the opposite end portion. In addition, the threads of the second member have a pitch which is greater than the pitch of the threads of the first member. This arrangement causes the second member to move a greater axial distance than the first member when the load binder is worked, thereby permitting the second member to have a length greater than the operative thread length of the larger member. In order to accommodate the penetration of the smaller member into the larger member, the larger member's cylindrical axial void extends past its operative thread length. The increased length and larger thread pitch of the second member and the increased depth of the axial cylindrical void of the first member account for the increased reach of the device.

In the preferred embodiment, the cylindrical void of the first member and the threaded length of the second member exceed the total length of the tubular body of the load binder. Furthermore, in order to prevent interference between the two members as they are screwed toward one another the interior end of the tubular first member is inwardly chamfered and the interior end of the second member is beveled to form a point. The chamfered tubular and pointed ends thereby define camming surfaces which guide the one into the other to thereby prevent axial abutment which would prevent further contraction of the turnbuckle. Also in the preferred embodiment, the tubular body includes radial openings which permit lateral access into its interior. These openings allow a means such as a weld deposit or a set-screw to be placed in the threads of the first and second members after they have been threaded into the ends of the tubular body to prevent their subsequent removal. Furthermore, the first member comprises a tubular member with its outboard end flattened in order to accommodate attachment to chain or cable grasping hardware. Still further, the outboard ends of the first and second members in the preferred embodiment are laterally displaced from the longitudinal axis of the axially extending tubular body in a manner which permits attachment to the chain or cable with the axis of the load binder lying along the axis of the chain or cable.

BRIEF DESCRIPTION OF THE DRAWINGS

The present invention may be better understood and its numerous objects and advantages will become apparent to those skilled in the art by reference to the accompanying drawings wherein like reference numerals refer to like elements in the several figures and in which:

FIG. 1 is a perspective view of the turnbuckle of the present invention;

FIG. 2 is a cross-sectional view of one end of the device taken along view lines 2—2;

FIG. 3 is a cross-sectional view of the ratchet of the load binder of FIG. 1 taken along view lines 3—3;

FIG. 4 is a cross-sectional view of the other end of the device of FIG. 1 taken along view lines 4—4;

FIG. 5 is a cross-sectional view of the entire turnbuckle of FIG. 1 taken along the view lines 5—5 wherein the device is shown in its fully extended condition;

FIG. 6 is a cross-sectional view of the device of the present invention similar to that of FIG. 5 wherein it is shown in its fully contracted position; and FIGS. 7 and 8 are enlargements of those areas of FIG. 5 as indicated in the drawing of FIG. 5.

DESCRIPTION OF THE BEST MODE OF THE INVENTION

While the invention is susceptible of various modifications and alternative constructions, there is shown in the drawings and there will hereinafter be described in detail, the description of the preferred or best known mode of the invention. It is to be understood, however, that the specific description and drawings are not intended to limit the invention to the specific form disclosed. On the contrary, it is intended that the scope of this patent include all modifications and alternative constructions thereof falling within the spirit and scope of the invention as expressed in the appended claims to the full range of their equivalence.

The invention, by way of example, is set forth and illustrated in FIGS. 1–8. Referring specifically now to the perspective view of the load binder 1 of FIG. 1, it can be seen that the load binder 1 includes an axially extending tubular body 2 having ratchet teeth 23 formed around its outside periphery for engagement by a reversible pawl 25 mounted on bolt 26 in ratchet handle 24. In a well known manner, the ratchet handle 24 and the pawl 25 can be operated to drive teeth 23 and thereby load binder body 2 in either the clockwise or counterclockwise direction. Opposite ends of the load binder tubular body 2 are provided with first and second end portions 3 and 4 respectively which have left and right hand threads 5 and 6 (seen best in FIGS. 5 and 6) formed on their respective inner surfaces. The diameter of the opening formed by threads 5 exceeds the diameter of the opening formed by threads 6. As may be seen from the preferred arrangement of FIG. 1, the exterior surface of end portion 4 is formed to comprise a nut so that, in the event ratchet handle 24 is broken or otherwise disabled, a standard open-ended wrench may be used to turn the turnbuckle.

First and second axially extending threaded members 7 and 8 with exterior left and right hand threads 10 and 9 respectively are adapted to be threaded into and to engage the threaded end openings 5 and 6 at opposite ends of body 2. Consistant with the diameter of the openings formed by threads 5 and 6, members 7 and 8 respectively have larger and smaller outside diameters. As can be seen from FIGS. 5 and 6, the first member 7 includes an axially extending cylindrical void 11 which has an inside diameter greater than the outside diameter of the smaller axially extending threaded member 8. In a preferred form, axially extending threaded member 7 comprises a tube with threads 9 machined or otherwise formed into its exterior surface.

Axially extending cylindrical void 11 is adapted to telescopically receive therewithin the second member 8 so that when the load binder is operated to draw the opposite members 7 and 8 toward one another, the right hand, and smaller diameter member 8, is conveniently telescopically received within cylindrical void 11. In this manner the total reach of the load binder may be significantly increased without increasing the length of body 2 which would have the undesirable effects of increasing the overall length of the load binder as well as its weight.

Telescopic insertion of member 8 into member 7 is assisted by the end configurations of both of the inboard ends of members 7 and 8. The tubular inboard end of member 7 is radially inwardly chamfered to provide centrally directed camming surfaces which guide the inboard end of member 8 into the cylindrical void 11. In addition, the inboard end of member 8 is beveled to form a point which also provides camming surfaces which assist in guiding member 8 into the cylindrical void 11 of member 7. As the result of these camming surfaces formed at the inboard ends of members 7 and 8, the threaded fit between the first and second threaded members 7 and 8 and the interior threads 5 and 6 of end portions 3 and 4 can be made without close tolerances. This loose fitting feature is desirable in that it not only reduces manufacturing costs but avoids binding of the load binder due to the binding effects of temperature changes and mechanical distortions as well as the intrusion of foreign particles of grit; all of which are commonly encountered operational hazards.

In the preferred form of the invention, the outboard ends of the axially extending threaded members 7 and 8 are flattened to terminate in plate-like attachment portions to which are attached pelican hooks 27 and 28 by means of bolts 29 and 30. The outboard ends 20 and 21 of members 7 and 8 respectively are also desirably laterally displaced away from the central longitudinal axis 22 of the load binder so that attached cables fitting in grooves 33 and 34 may properly align with this central axis 22. Pelican hooks 27 and 28 desirably include cable locating grooves 33 and 34 and are pivotally mounted for rotation between open, cable releasing positions and closed, cable retaining positions. Pelican hooks 27 and 28 are retained in the closed, cable retaining positions by means of links 31 and 32 respectively. In the event of an emergency in which rapid release of the load is required, the turnbuckle of the present invention may be rapidly disconnected by driving either link 31 or 32 off of the respective pelican hook 27 or 28 to permit it to open under the applied tension.

A further increase in reach of the turnbuckle of the present invention is made possible by the feature that the pitch of threads 10 on member 8 is greater than the pitch of threads 9 on member 7. Accordingly, rotation of body member 2 by ratchet handle 24 causes threaded member 8 to move a greater distance than threaded member 7. Advantage is taken of this feature by providing threaded portion of member 8 with a length which exceeds the length of the threaded portion of member 7 and, indeed, which exceeds the total length of the body 2 of the load binder. In order to accommodate the additional penetration of member 8 into tubular member 7 when the load binder is in its extreme drawn up configuration, member 7 is formed with its axial cylindrical void 11 extending a distance long enough to accommodate the entire length of the threaded portion of the member 8. In the preferred embodiment, member 7 is formed from a tubular member with threads 9 fabricated in its exterior surface. Therefore, the outboard end 20 is also tubular with its ends flattened to provide the planar attachment end as can be seen best in FIG. 2.

This critical feature and the advantages gained thereby are best seen in a comparison of FIGS. 5 and 6. FIG. 5 is an illustration of the telescopic turnbuckle in its fully extended configuration in which tubular member 7 and oppositely extending member 8 have been screwed to their extreme outermost position. When the ratchet handle 24 of the load binder is operated, members 7 and 8 are drawn toward one another with member 8 traveling at a faster rate since its thread pitch is greater. Accordingly, at a position to the left of the center of the load binder indicated by the location of the ratchet handle, ends 14 and 15 of members 7 and 8 respectively pass one another with end 15 being guided into the axial cylindrical void 11 of member 7. Continued operation of the load binder ratchet handle 24 causes member 7 to be moved to the right until it abuts against the axially innermost end 13 of the end portion 4 as shown in FIG. 6. At the same time, member 8 is being drawn to the left at a rate faster than the rate of travel of member 7 so that when end 14 of member 7 has come to rest against the stop surface 13, end 15 of member 8 has traveled to extend interiorly of member 7 past the outermost end of body 2 as shown. Thus it can be seen that cylindrical void 11 must have a length at least long enough to extend from the axially innermost end 13 of end portion 4 to a position radially inwardly adjacent to the interior threads 5 of the opposite end portion 3. Additionally, in the most preferred embodiment, both the cylindrical void 11 of member 7 and the threaded length of the member 8 exceed the total length of tubular body 2.

Another feature of the present invention is illustrated best in FIGS. 7 and 8. In order to prevent the undesirable and potentially dangerous situation in which the load binder ratchet handle 24 is operated until the opposite members 7 and 8 are screwed completely out of body 2, means 18 and 19 are provided in the ends 14 and 15 of the members 7 and 8 respectively to interrupt threads 9 and 10 in a manner which prevents their continued removal from threads 5 and 6. In the preferred form as shown, this means comprises set-screws 18 and 19 which have been placed in threads 9 and 10 after members 7 and 8 have been screwed into body 2 of the load binder. Openings 16 and 17 as shown are provided to permit access to the interior of body 2 so that set-screws 18 and 19 may be so placed. While the preferred embodiment includes set-screws 18 and 19, it should be apparent to those skilled in the art that a weld bead in the appropriate position would be equally as satisfactory. Openings 16 and 17 are also useful for enabling access to the interior of body 2 for lubrication of threads 9 and 10. While openings 16 and 17 are illustrated as being closed by cap-like members such as plastic caps put into place after set-screws 18 and 19 have been inserted, such additional closure caps are not deemed to be absolutely necessary.

What is claimed is:

1. A load binder (1) of the type having an axially extending tubular body (2) with first and second opposite end portions (3, 4) having right and left hand threads (5, 6) on their respective inner surfaces and including first and second axially extending threaded members (7, 8) with exterior threads (9, 10), each member being adapted to engage said threads of one of said opposite end portions (3, 4), said first member (7) having an axially extending cylindrical void (11) adapted to telescopically receive therewithin said second member (8), said second member (8) having an outside diameter smaller than the inside diameter of said cylindrical void (11) characterized in that said second member (8) includes a threaded length at least long enough to extend from the axially outermost end (12) of one of said end portions (4) to a position radially adjacent to the interior threads (5) of the opposite end portion (3), the threads (10) of said second member (8) having a pitch which is greater than the pitch of the threads (9) of said first member (7) and said cylindrical void (11) of said first member (7) has a length at least long enough to extend from the axially innermost end (13) of one of said end portions (14) to a position radially adjacent to the interior threads (5) of the opposite end portion (3).

2. The load binder (1) as recited in claim 1 characterized in that said cylindrical void (11) of said first member (7) and the threaded length of said second member (8) exceed the length of said tubular body (2).

3. The load binder (1) as recited in claim 1 characterized in that the inboard end (14) of said first member (7) is radially inwardly chamfered and the inboard end (15) of said second member (8) is beveled to form a point.

4. The load binder (1) as recited in claim 1 characterized in that said tubular body (2) includes an opening (16, 17) therethrough at each opposite end to permit interior access thereto and said first and second members (7, 8) includes means (18, 19) on the threads at their inboard ends (14, 15) for preventing the complete withdrawal of said members (7, 8) from their respective threaded opposite end portions (3, 4).

5. The load binder (1) as recited in claim 1 characterized in that said first member (7) comprises a tubular member with its outboard end (20) flattened to form a plate-like attachment portion.

6. The load binder as recited in claim 5 characterized in that the outboard ends (20, 21) of said first and second members (7, 8) are laterally displaced from the central longitudinal axis (22) of said axially extending tubular body (2).

7. The load binder (1) as recited in claim 1 characterized in that said tubular body (2) includes ratchet teeth (23) formed around its periphery for engagement by a ratchet (24).

8. The load binder (1) as recited in claim 1 characterized in that said tubular body (2) includes a portion (4) formed to have means thereon suitable for engagement by a standard wrench whereby said load binder may be operated by said wrench.

9. The load binder (1) as recited in claim 8 characterized in that said portion (4) is formed in the shape of a hexagonal nut.

10. The load binder (1) as recited in claim 1 characterized in that the inboard end (14) of said first member (7) is radially inwardly chamfered.

11. The load binder (1) as recited in claim 1 characterized in that the inboard ends (15) of said second member (8) is beveled.

* * * * *